United States Patent [19]

Wang

[11] Patent Number: 5,284,181

[45] Date of Patent: Feb. 8, 1994

[54] COUPLER ASSEMBLY FOR A PRESSURE PUMP

[76] Inventor: Chung-Jang Wang, No. 3, Pei-Chuang Rd., Shen-Kang Hsiang, Taichung Hsien, Taiwan

[21] Appl. No.: 60,221

[22] Filed: May 10, 1993

[51] Int. Cl.⁵ .................... F16K 37/00; B65H 75/46
[52] U.S. Cl. .................. 137/557; 137/355.16; 137/355.26; 137/355.27
[58] Field of Search ............ 137/355.16, 355.19, 137/355.26, 355.27, 377, 382, 557

[56] References Cited

U.S. PATENT DOCUMENTS

| | | | |
|---|---|---|---|
| 3,820,559 | 6/1974 | Griffiths et al. | 137/355.16 |
| 3,977,429 | 8/1976 | Stevenson | 137/355.27 |
| 4,487,218 | 12/1984 | Sifri | 137/355.26 |
| 4,878,517 | 11/1989 | Prange | 137/355.26 |
| 5,058,758 | 10/1991 | Suddeth | 137/382 |

Primary Examiner—A. Michael Chambers
Attorney, Agent, or Firm—Christie, Parker & Hale

[57] ABSTRACT

A coupler assembly for a pressure pump includes a vertical stand and a sheave mounted rotatably on the stand. The sheave includes a main shaft which is hollowed partially adjacent to one end of the same to define a recess and which has a through hole formed in an external surface to communicate the recess and an exterior of the main shaft. An enclosed casing is fixed in the recess and has a circular plate that is disposed opposite to a bottom of the recess. The circular plate has a pressure gauge communicated with an interior of the enclosed casing, a plurality of coupling members and a release valve to release pressure from within the enclosed casing to an exterior of the enclosed casing.

3 Claims, 5 Drawing Sheets

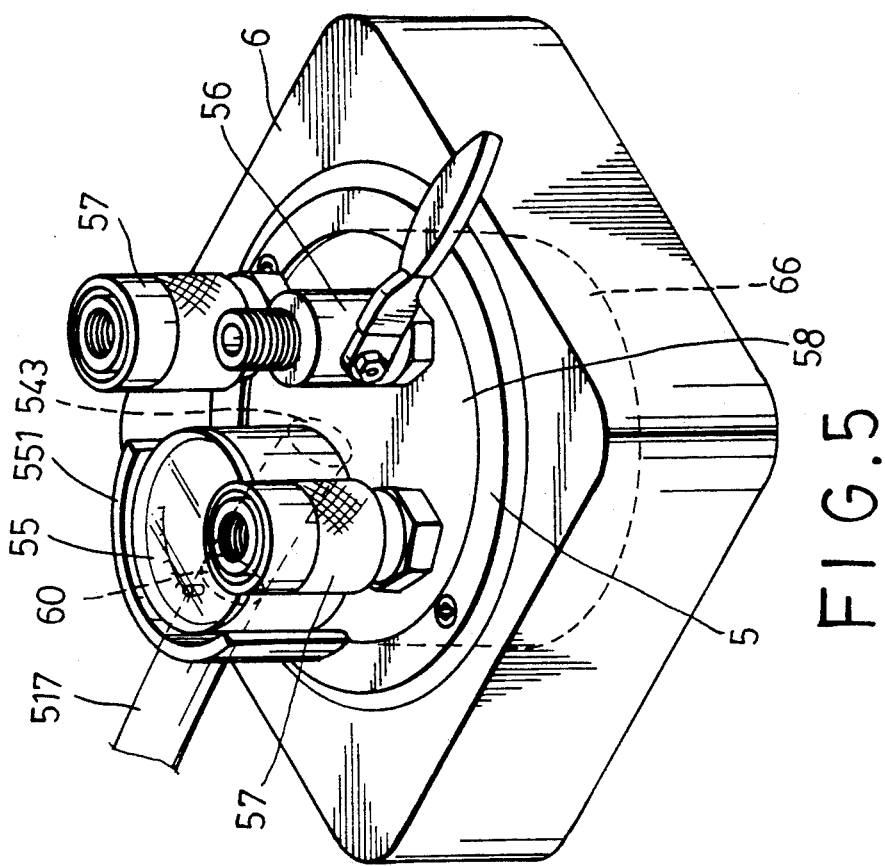

COUPLER ASSEMBLY FOR A PRESSURE PUMP

BACKGROUND OF THE INVENTION

1. Field of the Invention

The invention relates to a coupler assembly, more particularly to a coupler assembly for a pressure pump.

2. Description of the Related Art

Referring to FIG. 1, a conventional coupler assembly (9) for a pressure pump is shown to comprise a plurality of quick-release coupling members (90). A connecting gas pipe (91) is connected to a pressure pump and supplies pressure to the coupling members (90). Pressure operated units, such as a nailing gun, a drilling machine or an inflating tube with an inflating valve can be connected detachably to the quick-release coupling members (90) for use.

One drawback of the conventional coupler assembly is that a user cannot know the exact pressure that is supplied by the coupler assembly (9), thus inconveniencing the user. In addition, the conventional coupler assembly does not include a releasing means for releasing moisture which accumulates within the conventional coupler assembly (9) and which can reduce the efficiency of pressure output of the coupler assembly (9).

SUMMARY OF THE INVENTION

A main objective of the present invention is to provide a coupler assembly for a pressure pump which includes a pressure gauge and a pressure releasing valve so that a user can know the exact pressure value therein and so that the user can release the moisture trapped within the coupler assembly.

According to the present invention, the coupler assembly for a pressure pump includes a vertical stand and a sheave that is mounted rotatably to the vertical stand. The sheave includes a main shaft that has a recess with a flat bottom formed adjacent to one end of the main shaft and a through-hole formed in an external surface which communicates the recess and an exterior of the main shaft. An enclosed casing is fixed in the recess of the main shaft and has a threaded inlet-hole which communicates an interior of the enclosed casing and the through-hole of the main shaft, and a circular plate that is generally disposed opposite to the flat bottom of the recess. The circular plate has a pressure gauge which is mounted thereon and which is in communication with the interior of the enclosed casing, a plurality of quick release coupling members and a valve to release pressure from within the enclosed casing.

In one preferred embodiment, the coupler assembly does not include a rotatable sheave, while the enclosed casing is fixed in a recess formed in a base support that has a through bore which communicates the recess and the exterior of the base support. A first end of a gas pipe can be inserted into the through bore to connect a threaded inlet hole formed through a wall body of the enclosed casing. A threaded hole which is formed in the bottom the enclosed casing, is sealed so as to close the same.

The user of the coupler assembly of the present invention can know the pressure within the coupler assembly so that he can determine in advance if the pressure operated unit that is to be used can be operated properly with the use of the present coupler assembly. The user can also release moisture within the coupler assembly so as to retain the pressure output at the most effective level.

BRIEF DESCRIPTION OF THE DRAWINGS

Other features and advantages of the present invention will become more apparent in the following detailed description of the preferred embodiments with reference to the accompanying drawings, in which:

FIG. 5 shows a second preferred embodiment of a coupler assembly for a pressure pump in accordance with the present invention.

DETAILED DESCRIPTION OF THE PREFERRED EMBODIMENTS

Figure 1:
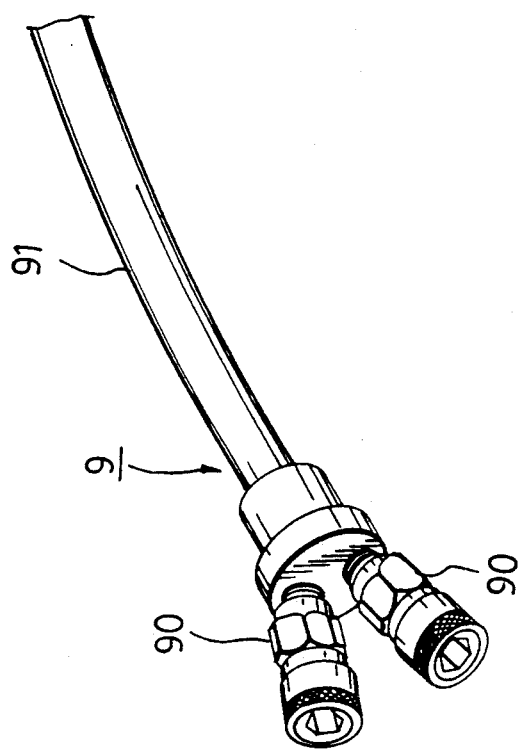
FIG. 1 shows a conventional coupler assembly for a pressure pump.
Figure 2:
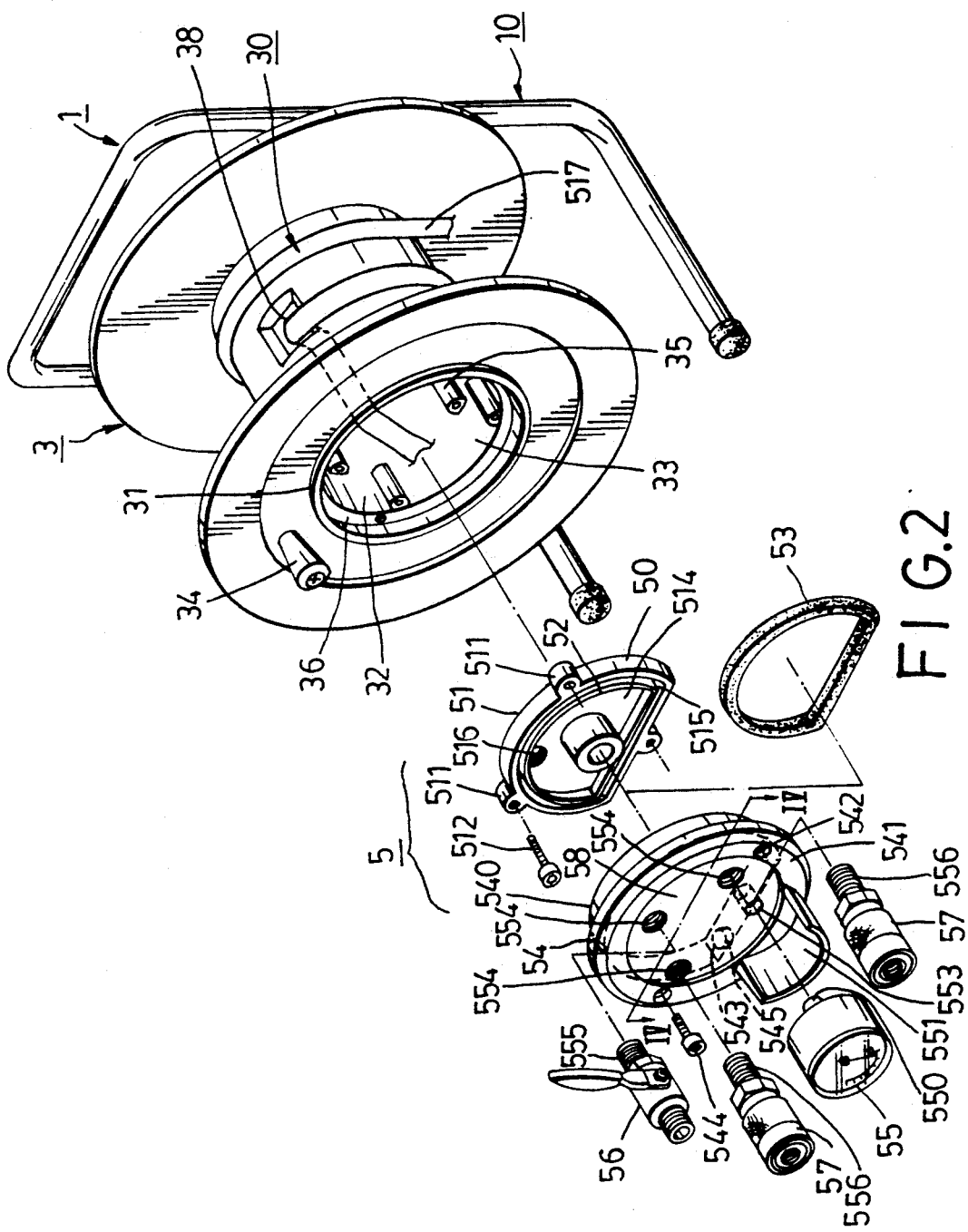
FIG. 2 is an exploded view of a first preferred embodiment of a coupler assembly for a pressure pump according to the present invention.
Figure 3:
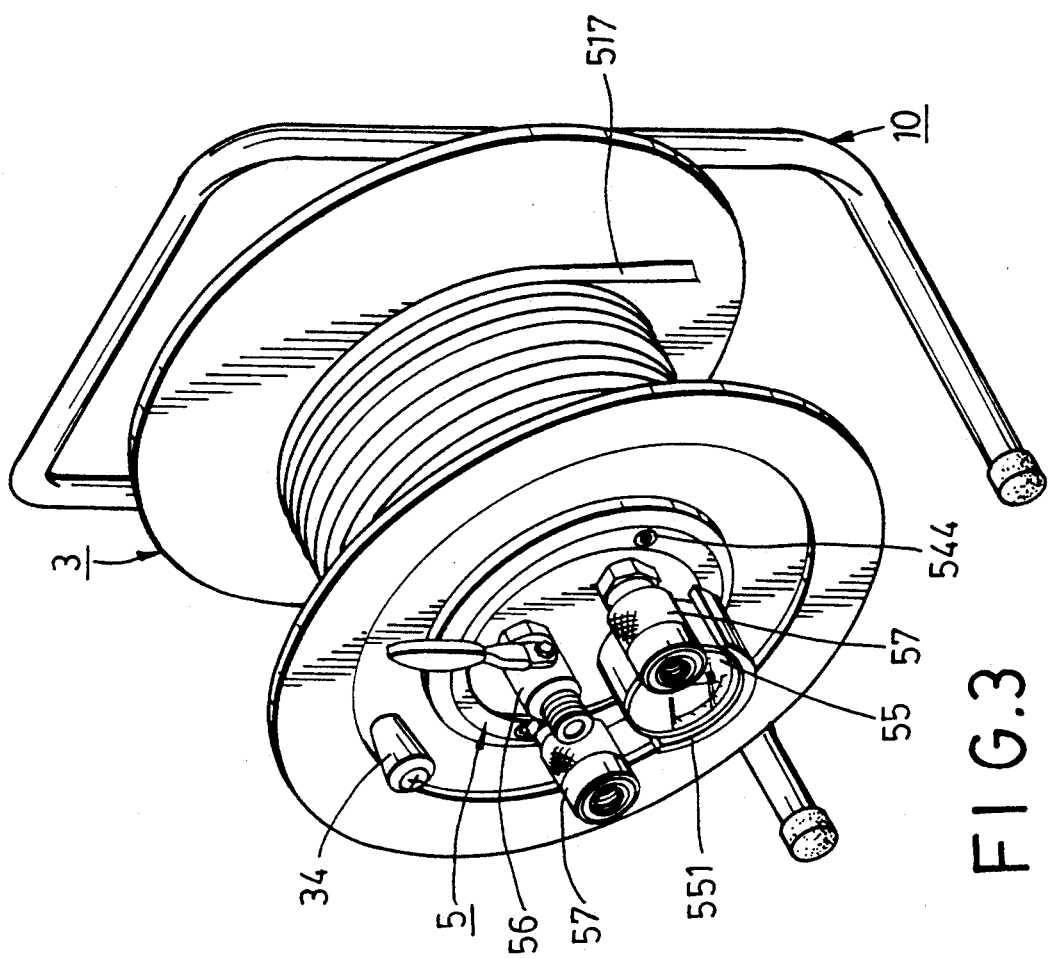
FIG. 3 shows a perspective view of the first preferred embodiment of the coupler assembly of the present invention.

Referring to FIGS. 2 and 3, a coupler assembly (1) for a pressure pump according to the present invention is shown to include a vertical stand (10), a sheave (3) which is mounted rotatably to the vertical stand (10) and which has a handle (34) for rotating the same.

The sheave (3) includes a main shaft (30) which has a recess (33) with a flat bottom (32) formed adjacent to one end (31) of the main shaft (30). The flat bottom (32) is provided with a plurality of pedestals (35) and a shoulder (36) which is formed between the flat bottom (32) and the end (31) of the main shaft (30). The main shaft (30) has a through-hole (38) which is formed in an external surface thereof and which communicates an exterior of the main shaft (30) and the recess (33).

An enclosed casing (5) includes a first half (51) that is placed inside the recess (33) and a second half (54). The first half (51) includes a semi-circular plate (52) and a surrounding wall (50) that is formed along the periphery of the semi-circular plate (52) so as to define a first space (514) therein and that has three peripheral ears (511). The surrounding wall (50) is provided with a first endless groove (515) which is formed along the periphery of the same. The semicircular plate (52) has a threaded-hole (516) to receive threadedly a first end of a gas;pipe (517) which enters into the recess (33) via the through-hole (38) of the main shaft (30). Three locking screws (512) are inserted through the peripheral ears (511) and are threaded to the pedestals (35) of the flat bottom (32).

Figure 4:
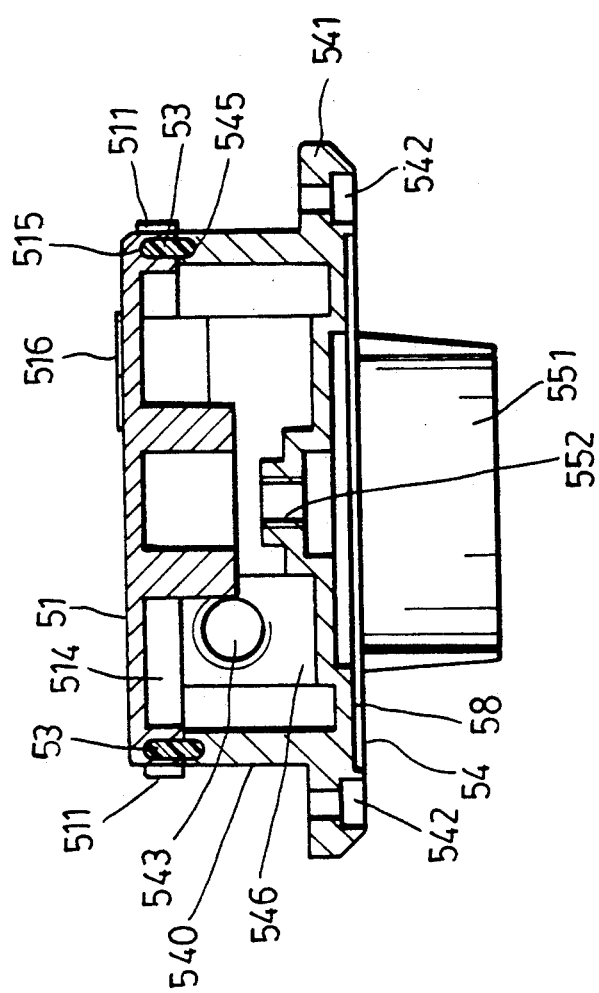
FIG. 4 is a top view of the coupler assembly shown in FIG. 3, the vertical stand thereof being removed for purpose of better illustration.

Referring to FIGS. 3 and 4, the second half (54) includes a circular plate (58) and a surrounding wall body (540) which has a cross section similar to the surrounding wall (50) of the first half (51). The wall body (540) is provided on one side of the circular plate (58) and defines a second receiving space (546) therein. The surrounding wall body (540) has a threaded hole (543) formed therethrough and a free end which is provided with an endless groove (545) that is formed along the periphery of the same. The circular plate (58) of the second half (54) has a flange portion (541) provided with two holes (542). A rubber ring (53) is disposed between the first and second halves (51, 54) and is ,received in an annular groove defined by the endless grooves (515, 545) of the first and second halves (51, 54). When two locking bolts (544) are inserted through the holes (542) in the flange portion (541) of the second half (54) and are threaded to the shoulder (36) of the recess (33), the rubber ring (53) engages frictionally the first and second halves (51, 54) in the endless grooves (515, 545) to seal the enclosed casing (5) hermetically.

An important aspect to note here is that the surrounding wall body (540) of the second half (54) has a threaded-hole (543) which is formed therethrough and which is sealed by a threaded plug (545) so that pressure within the enclosed casing (5) cannot escape to an exterior of the same in the present preferred embodiment.

When the coupler assembly (1) of the present invention is in use, a second end of the gas pipe (517) is connected to a pressure pump (not shown). The second end of the gas pipe (517) is detached from the pressure pump and can be coiled on the main shaft (30), as shown in FIG. 3, by rotating the handle (36) when the coupler assembly (1) is not in use.

After assembly, the circular plate (58) of the enclosed casing (5) is generally disposed opposite to the bottom (32) of the recess (33) and is provided with four threaded holes (553, 554). A pressure gauge (55), a pair of quick release coupling members (57) and a release valve (56) are threaded in a respective one of the threaded holes (553, 554) in the circular plate (58). Since a seal tape is wrapped around the threaded portions (550, 555, 556) of the pressure gauge (55), the coupling members (57) and the release valve (56) before the latter are connected threadedly to the threaded holes (553, 554), pressure within the enclosed casing (5) cannot escape via the holes (553, 554) unless the coupling members (57) and the release valve (56) are operated. The pressure gauge (55), which is in communication with an interior of the enclosed casing (5), will show a corresponding value of an incoming pressure when the second end of the gas pipe (517) is connected to the pressure pump. Should the user feel that moisture has accumulated within the enclosed casing (5), thus decreasing the pressure output, moisture can be released from within the enclosed casing (5) by actuating the release valve (56).

Some pressure operated tools, such a nailing gun or drilling machine, can be connected to the coupling members (57) so as to be operated pneumatically. Since the user can know the input pressure to the tools by reading the pressure gauge (55), he can determine in advance whether a particular tool can be properly operated with the use of the coupler assembly of the present invention. In the event, the pressure output of the coupler assembly is insufficient to drive a desired tool, the pressure output of the coupler assembly can be adjusted by operating an adjustable knob of the pressure pump, thereby retaining the pressure at the most effective state. The conventional coupler assembly fails to provide such features. The feature and object of the present invention are accordingly obtained.

A protection member (551) can be mounted on the circular plate (58) of the enclosed casing (5) so as to protect the pressure gauge (55), from breakage.

Referring to FIG. 5, the construction of the second preferred embodiment of a coupler assembly according to the present invention is similar to the first embodiment except that it does not include a rotatable sheave and the enclosed casing (5) is mounted in a base support (6). The base support (6) has an internal wall (65) which confines a recess therein and a through bore (60) which extends through the internal wall (65) and the recess. A first end of the gas pipe (517) is inserted into the through bore (60) to connect threadedly with a threaded hole (543) that is formed in the surrounding wall body (540) of the second half (54) of the enclosed casing (5). The threaded hole (516) is closed by a threaded plug. The feature and object are the same as in the previous embodiment.

While preferred embodiments have been explained and described, it will be apparent that many changes and modifications can be made in the general construction and arrangement of the present invention without departing from the scope and spirit thereof. Therefore, it is desired that the present invention be not limited to the exact disclosure but only to the extent of the appended claims.

I claim:

1. A coupler assembly for a pressure pump comprising:
    a base support having an internal wall which confines a recess therein and a through bore that passes through said internal wall;
    an enclosed casing provided in said recess of said base support and having a threaded inlet-hole which is formed through a wall body of said enclosed casing and which is communicated with said through bore, and a circular plate which is opposite to a bottom of said recess, said circular plate having a pressure gauge, a plurality of quick release coupling members and a valve connected to said circular plate in order to communicate an interior of said enclosed casing and an exterior of said enclosed casing; and
    a coil of connecting gas pipe having an end that enters said through bore of said base support to connect threadedly with said inlet hole of said enclosed casing.

2. A coupler assembly for a pressure pump, comprising:
    a vertical stand;
    a sheave mounted rotatably to said vertical stand, said sheave including a main shaft that has a recess formed adjacent to one end of said main shaft, and a through-hole which communicates said recess and an exterior of said main shaft;
    an enclosed casing provided in said recess, said enclosed casing having a circular plate that is opposite to a bottom of said recess, said enclosed casing having an threaded inlet hole which is formed in a wall body of said enclosed casing and which communicates said recess of said main shaft and an interior of said enclosed casing, said circular plate having a pressure gauge connected to an interior of said enclosed casing, a plurality of quick release coupling members and a valve which allows pressure to be released from said interior to an exterior of said enclosed casing; and
    a coil of connecting gas pipe having a first end that enters into said recess via said through hole of said main shaft to connect threadedly said threaded inlet hole of said enclosed casing and a second end that is coiled on said main shaft.

3. The coupler assembly as defined in claim 2, wherein said enclosed casing includes a first half, a second half, and a rubber ring which is disposed between said first and second halves to provide a leakproof effect when said first and second halves are connected to one another, said circular plate being formed in said second half, said recess further including a shoulder formed between said bottom and said one end of said main shaft, said enclosed casing further having a flange portion which is provided along the periphery of said circular plate and a plurality of locking screws which pass through said flange portion to engage said shoulder.

* * * * *